United States Patent Office 2,992,220
Patented July 11, 1961

2,992,220
NEW ANTHRA-1':9'(N):10'(N):5'-DIPYRIDA-
ZONES AND ANTHRA-1':9'(N):10'(N):4'-
DIPYRIDAZONES CHEMICAL COMPOUNDS
Francis Irving, Charles Hugh Reece, and Robert Hugh
Wilsen, Manchester, England, assignors to Imperial
Chemical Industries Limited, London, England, a corporation of Great Britain
No Drawing. Filed Nov. 29, 1957, Ser. No. 699,440
Claims priority, application Great Britain Dec. 5, 1956
7 Claims. (Cl. 260—250)

This invention relates to polycyclic organic compounds and more particularly it relates to compounds of the anthra-dipyridizone series which are useful for the production of fluorescent effects.

According to our invention we provide anthra-1':9'(N):(10)'(N):5'-dipyridazones and anthra-1':9'(N):10'(N):4'-dipyridazones of the formulae:

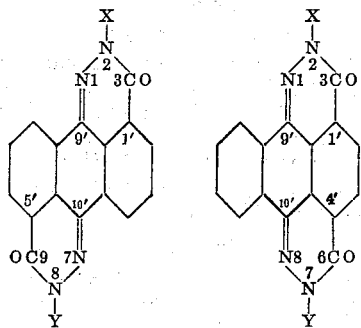

in which X and Y may be the same or different and stand for either a hydrogen atom or a monovalent organic radical.

As examples of a monovalent organic radical there may be mentioned alkyl, hydroxyalkyl, alkoxyalkyl, cycloalkyl, including alkylcycloalkyl, alkenyl, aralkyl, including aralkyl which may be substituted by alkyl or halogen such as chlorine, aryl, including aryl which may be substituted by alkyl, alkoxy, or halogen such as chlorine, and heterocyclic including alkylheterocyclic radicals.

According to a further feature of our invention we provide a process for the manufacture of the anthra-1':9'(N):10'(N):5'-dipyridazones and anthra-1':9'(N):10'(N):4'-dipyridazones which comprises interacting a hydrazine of formula NH₂NHY, where Y has the significance given above, with an anthra-1':9'(N)-pyridazone compound of the formula:

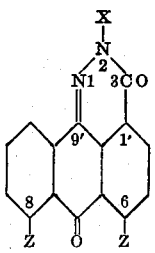

in which X has the significance given above and one Z stands for a hydrogen atom and the other Z stands for a carboxyl group or a functional derivative thereof.

The functional derivative of the carboxylic group may be, for example, an ester, acid chloride, amide, or nitrile group.

As examples of hydrazines suitable for use in the process of our invention there may be mentioned, for example, hydrazine, methylhydrazine, ethylhydrazine, n-butylhydrazine, hydroxyethylhydrazine, allylhydrazine, hydrazinoacetic acid, α-naphthylhydrazine, phenylhydrazine, p-tolylhydrazine, o-chlorophenylhydrazine, 2:5-dichlorophenylhydrazine, 2:6-dimethylphenylhydrazine, and 3-hydrazinopyridine.

The anthra-1':9'(N)-pyridazones used in the above process may be obtained for example by interaction of anthra-quinone-1:5-dicarboxylic acid or anthraquinone-1:4-dicarboxylic acid or a functional derivative of either of these acids, with a hydrazine of the formula NH₂.NHX where X has the meaning stated above in the presence of one molecular proportion of alkali for example caustic soda. The interaction may be carried out in the absence of one molecular proportion of alkali provided that the quantity of the hydrazine used is insufficient to convert the anthrapyridazone so formed to the corresponding anthradipyridazone.

The interaction of the anthra-1':9'(N)-pyridazone with the hydrazine is carried out in general by heating the reactants together, if desired, in a liquid medium for example in xylene, acetic acid, sulphuric acid, oleum, water or mixtures of two or more of these liquids.

When the interaction is carried out in a non-aqueous medium, any water formed may, if desired, be removed during the reaction, for example by azeotropic distillation.

When the radicals represented by X and Y in the above formulae are the same it is preferred to manufacture the anthradipyridazones directly from the appropriate anthraquinonedicarboxylic acid or its functional derivative by interaction with the appropriate hydrazine compound without isolating the intermediate anthra-1':9'(N)-pyridazone and this forms a further feature of our invention.

The anthradipyridazones of the invention are orange or yellow in colour although some of them are only very faintly coloured. The anthradipyridazones of the invention give strongly blue fluorescent solutions in organic solvents and are valuable for modifying the colour of polymeric materials. The compounds which are not themselves strongly coloured are valuable for improving the whiteness of materials which have a yellowish tinge, and the compounds which are themselves strongly coloured are suitable for use as colouring matters. The anthradipyridazones of our invention may be incorporated in for example paints, lacquers, varnishes and polymeric materials such as cellulose acetate, polystyrene, polyamides and polyesters.

The application of the anthradipyridazones to these materials may be carried out by the methods commonly used for the application of colouring matters or whitening agents to the materials. The anthradipyridazone may for example be added during the manufacture of the polymeric material or added to the polymeric material before the material is spun, extruded or otherwise shaped. Alternatively, films and textile materials may be treated with a solution or suspension of the anthradipyridazone preferably at an elevated temperature and optionally at superatmospheric pressure.

The invention is illustrated but not limited by the following examples in which parts and percentages are by weight:

*Example 1*

A mixture of 2 parts of 2-n-butylanthra-1:9'(N)-pyridazone-8-carboxylic acid and 1 part of 2:6-dimethylphenylhydrazine is heated at 220° C. for 30 minutes. The reaction mixture is cooled and stirred with 100 parts of boiling 1% aqueous caustic soda solution. The suspension is filtered and the residue on the filter is stirred with 100 parts of boiling 1% hydrochloric acid. The suspension is filtered and the residue on the filter is crystallised from ethanol when 2-(2":6"-dimethylphenyl)-8-n-butyl-anthra-1':9'(N):10'(N):5-dipyridazone is obtained as a pale yellow powder melting between 198° C. and 200° C.

The 2-n-buytlanthra-1':9'(N)-pyridazone-8-carboxylic acid used in this example may be obtained as follows:

A mixture of 10 parts of anthraquinone-1:5-dicarboxylic acid, 3 parts of n-butylhydrazine and 1.3 parts of caustic soda is heated at 200° C. for 15 minutes. The reaction mixture is then cooled and stirred with 200 parts of boiling 1% aqueous caustic soda solution. The suspension so obtained is filtered and 20 parts of sodium chloride are added to the cooled filtrate. The precipitated sodium salt is filtered off and dissolved in 300 parts of water and 15 parts of 10% hydrochloric acid are then added to precipitate 2-n-butylanthra-1':9'(N)-pyridazone-8-carboxylic acid which melts at 250° C.

Example 2

The 2 parts of 2-n-butylanthra-1':9'(N)-pyridazone-8-carboxylic acid used in Example 1 are replaced by 4 parts of 2-(2":6"-dimethylphenyl)anthra-1':9'(N)-pyridazone-8-carboxylic acid and the 1 part of 2:6-dimethylphenylhydrazine by 1 part of n-butylhydrazine. 2-(2":6"-dimethylphenyl) - 8 - n - butylanthra - 1':9'(N):10'(N):5'-dipyridazone identical with that described in Example 1 is obtained.

The 2-(2":6"-dimethylphenyl)anthra-1':9'(N)-pyridazone-8-carboxylic acid used in this example may be obtained by the method described in Example 1 for 2-n-butylanthra-1':9'(N)-pyridazone-8-carboxylic acid using 5 parts of 2:6-dimethylphenylhydrazine in place of 3 parts of n-butylhydrazine. 2-(2":6"-dimethylphenyl)anthra-1':9'(N)-pyridazone-8-carboxylic acid is a pale yellow powder melting between 310° C. and 312° C.

Example 3

A mixture of 12 parts of anthraquinone-1:5-dicarboxylic acid, 24 parts of phenylhydrazine and 200 parts of xylene is stirred and boiled and the water formed in the reaction is continuously distilled off with xylene. When the formation of water can no longer be observed the mixture is cooled and filtered. The residue on the filter is washed with ethanol, and then stirred with boiling 2% aqueous sodium carbonate solution and again filtered. The residue is washed with water and dried. The resulting 2:8-diphenylanthra-1':9'(N):10'(N):5'-dipyridazone is crystallised from o-dichlorobenzene and obtained in the form of greenish yellow crystals melting between 391° and 393° C. It dissolves in concentrated sulphuric acid to give a yellow solution and in high boiling organic solvents to give yellow solutions which are characterised by having a blue fluorescence.

Example 4

The 24 parts of phenylhydrazine used in Example 3 are replaced by 17 parts of p-tolylhydrazine. 2:8-di-p-tolylanthra-1':9'(N):10'(N):5'-dipyridazone is obtained. This compound gives solutions similar to the product of Example 3 and does not melt below 390° C.

Example 5

The 24 parts of phenylhydrazine used in Example 3 are replaced by 17.5 parts of 2-chlorophenylhydrazine. There is obtained 2:8-di(2"-chlorophenyl)anthra-1':9'(N):10'(N):5'-dipyridazone, which is a pale yellow compound melting at 400° C.

Example 6

The 24 parts of phenylhydrazine used in Example 3 are replaced by 21.5 parts of 2:5-dichlorophenylhydrazine. There is obtained 2:8-di(2":5"-dichlorophenyl)anthra-1':9'(N):10'(N):5'-dipyridazone, which is a pale yellow compound melting at 432° C.

Example 7

5% aqueous caustic soda solution is added to 20.7 parts of butylhydrazine sulphate until the resulting solution is faintly alkaline to Clayton Yellow test paper. 6 parts of anthraquinone-1:5-dicarboxylic acid and 100 parts of xylene are then added and the mixture is stirred and distilled. Water is removed from the condensed vapour and the residual xylene is returned to the reaction mixture. When no more water is obtained the mixture is cooled, and filtered. The residue on the filter is washed with ethanol, stirred with boiling 1% aqueous caustic soda solution and again filtered off. The residue on the filter is washed with water and dried. The resulting 2:8-dibutylanthra-1':9'(N):10'(N):5'-dipyridazone is crystallised from ethanol to give a yellow powder melting between 180° C. and 186° C.

Example 8

The 12 parts of anthraquinone-1:5-dicarboxylic acid used in Example 3 are replaced by 12 parts of anthraquinone-1:4-dicarboxylic acid. There is obtained 2:7-diphenylanthra - 1':9'(N):10'(N):4' - dipyridazone which is crystallised from o-dichlorobenzene to give light greenish yellow crystals melting between 394.5° C. and 396° C. It dissolves in concentrated sulphuric acid to give a greenish yellow solution and in organic solvents to give greenish yellow solutions which show a blue fluorescence.

Example 9

A mixture of 29.6 parts of anthraquinone-1:5-dicarboxylic acid, 28.6 parts of hydrazine sulphate, and 128 parts of 30% oleum is heated at between 60° C. and 65° C. for 5 hours. The solution so obtained is cooled and poured into a mixture of ice and water. The suspension is filtered when anthra-1':9'(N):10'(N):5'-dipyridazone is obtained in the form of a light brown powder which does not melt below 400° C.

Example 10

10% aqueous sodium hydroxide is added to an aqueous solution of 2 parts of 2:6-dimethylphenylhydrazine hydrochloride until the solution is just alkaline to Clayton Yellow test paper. 1 part of anthraquinone-1:5-dicarboxylic acid is added and the solution is evaporated to dryness and the residue is heated at between 200° C. and 220° C. for 15 minutes. The reaction mass is cooled, stirred with boiling 1% aqueous caustic soda and filtered, and the residue on the filter is stirred with boiling 1% hydrochloric acid and then filtered off. The residue on the filter is stirred with boiling ethanol and the suspension cooled and filtered. The residue on the filter is crystallised from o-dichlorobenzene to give 2:8-di(2":6"-dimethylphenyl)anthra - 1':9'(N):10'(N):5' - dipyridazone as a light yellow powder which melts at 369° C.

Example 11

8 parts of anthraquinone-1:5-dicarboxylic acid, 5 parts of sodium carbonate, 2 parts of sodium acetate trihydrate and 10 parts of 2:6-dimethylphenylhydrazine hydrochloride are dissolved in water. Hydrochloric acid is added to adjust the pH to between 4.8 and 5.2 and the solution obtained is boiled for 24 hours. The solution is cooled and hydrochloric acid is added until the mixture is acid to Congo Red test paper. The suspension so obtained is filtered. The residue on the filter is stirred with 300 parts of boiling 2% sodium carbonate solution and again filtered off. The residue on the filter is stirred with boiling ethanol, and the suspension is cooled and filtered. The residue on the filter is crystallised from o-dichlorobenzene to give 2:8-di(2":6"-dimethylphenyl)anthra-1':9'(N):10'(N):5'-dipyridazone identical with that described in Example 10.

Hydrochloric acid is added to the filtrate from the sodium carbonate extraction until the mixture is acid to Congo Red test paper. A precipitate of 2-(2":6"-dimethylphenyl)anthra - 1':9'(N) - pyridazone - 8 - carboxylic acid, identical with that described in Example 2 is obtained.

Example 12

A mixture of 24 parts of 2-hydroxyethylhydrazine and 24 parts of anthraquinone-1:5-dicarboxylic acid is heated at 180° for 5 minutes. The reaction mixture is cooled, stirred with boiling 1% hydrochloric acid and filtered. The residue on the filter is stirred with boiling 1% sodium carbonate solution and filtered off, and the residue on the filter is stirred with boiling ethanol, cooled, and again filtered off. The residue on the filter is crystallised from o-dichlorobenzene to give 2:8-di(2″-hydroxyethyl)anthra-1′:9′(N):10′(N):5′-dipyridazone which is a yellow powder melting at 307° C.

*Example 13*

A mixture of 20 parts of 2-(2″:6″-dimethylphenyl)anthra-1′:9′(N)-pyridazone-8-carboxylic acid, 10 parts of hydrazine hydrate and 100 parts of water is boiled for 24 hours. A further 250 parts of water are added, and the suspension is heated to 100° C. and filtered hot. The residue on the filter is crystallised from o-dichlorobenzene to give 2 - (2″:6″ - dimethylphenyl)anthra - 1′:9′(N):10′(N):5′-dipyridazone which melts between 348° C. and 350° C.

*Example 14*

The 10 parts of 2:6-dimethylphenylhydrazine hydrochloride used in Example 11 are replaced by 12 parts of 2:6 - diethylphenyl - hydrazine hydrochloride. 2:8 - di-(2″:6″ - diethylphenyl)anthra - 1′:9′(N):10′(N):5′ - dipyridazone is obtained as a pale yellow powder which melts at 362° C.

*Example 15*

The 20 parts of 2 - (2″:6″ - dimethylphenyl)anthra-1′:9′(N)-pyridazone-8-carboxylic acid used in Example 13 are replaced by 20 parts of 2-(2″:6″-diethylphenyl)-anthra-1′:9′(N)-pyridazone-8-carboxylic acid. 2-(2″:6″-diethylphenyl)anthra - 1′:9′(N):10′(N): 5′ - dipyridazone of M.P. 300° C. is obtained.

The 2 - (2″:6″ - diethylphenyl)anthra - 1′:9′(N) - pyridazone-8-carboxylic acid used in this example may be obtained by the method described in Example 1 for 2-n-butylanthra-1′:9′(N)-pyridazone-8-carboxylic acid, using 5.6 parts of 2:6-diethylphenylhydrazine in place of 3 parts of n-butylhydrazine.

2 - (2″:6″ - diethylphenyl)anthra - 1′:9′ - (N) - pyridazone-8-carboxylic acid is a pale yellow powder.

*Example 16*

The 2 parts of 2:6-dimethylphenylhydrazine hydrochloride used in Example 10 are replaced by 2 parts of o-bromophenylhydrazine hydrochloride. The 2:8 - di(o-bromophenyl)anthra - 1′:9′(N):10′(N):5′ - dipyridazone obtained is a cream coloured powder.

*Example 17*

The 20 parts of 2-(2″:6″-dimethylphenyl)anthra-1′:9′(N)-pyridazone-8-carboxylic acid used in Example 13 are replaced by 20 parts of 2-(6″-chloro-2″-methylphenyl)anthra-1′:9′(N)-pyridazone-8-carboxylic acid. 2-(6″-chloro - 2″ - methylphenyl)anthra-1′:9′(N):10′(N): 5′-dipyridazone of M.P. 349° C. is obtained.

The 2 - (6″-chloro-2″-methylphenyl)anthra-1′:9′(N)-pyridazone-8-carboxylic acid used in this example may be obtained by the method described in Example 1 for 2-n-butylanthra-1′:9′(N)-pyridazone-8-carboxylic acid, using 5.3 parts of 6-chloro-2-methylphenylhydrazine in place of the 3 parts of n-butylhydrazine.

2-(6″-chloro - 2″ - methylphenyl)anthra - 1′:9′ - (N)-pyridazone-8-carboxylic acid is a pale yellow powder melting at 305° C.

*Example 18*

A mixture of 4.8 parts of 2-(2″:6″-dichlorophenyl) anthra-1′:9′(N)-pyridazone-8-carboxylic acid, 100 parts of water and 20 parts of hydrazine hydrate is boiled for 16 hours. The resulting suspension is filtered, and the residue washed successively with 2% aqueous sodium carbonate solution and ethanol and then crystallized from o-dichlorobenzene. 2 - (2″:6″ - dichlorophenyl)anthra-1′:9′(N):10′(N):5′-dipyridazone is obtained as a yellow powder which melts at 379° C.

The 2-(2″:6″-dichlorophenyl)anthra-1′:9′(N)-pyridazone-8-carboxylic acid used in this example may be obtained by the following method:

A mixture of 15 parts of anthraquinone-1:5-dicarboxylic acid, 8.8 parts of 2:6-dichlorophenylhydrazine, 2 parts of caustic soda and 100 parts of water is boiled for 24 hours, and the resulting suspension is made alkaline with sodium carbonate to Brilliant Yellow test paper and filtered. The residue is extracted three times with 400 parts of water containing a little sodium carbonate each time, and to the combined extracts 60 parts of sodium chloride are added. The sodium salt of 2-(2″:6″-dichlorophenyl)anthra - 1′:9′(N) - pyridazone - 8 - carboxylic acid separates out and is filtered off and dissolved in water. The solution so obtained is acidified with hydrochloric acid to precipitate 2 - (2″:6″ - dichlorophenyl) anthra-1′:9′(N)-pyridazone-8-carboxylic acid which is a pale grey solid melting at 325° C.

*Example 19*

A mixture of 3 parts of anthra-1′:9′(N)-pyridazone-8-carboxylic acid and 5 parts of 2:6-dichlorophenylhydrazine is heated for one hour at 220° C. The product is successively extracted with dilute hydrochloric acid, dilute sodium carbonate solution and ethanol, and the residue is crystallized from o-dichlorobenzene. 2-(2″:6″-dichlorophenyl)anthra-1′:9′(N):10′(N):5′-dipyridazone identical with that prepared in Example 18 is obtained.

The anthra-1′:9′(N)-pyridazone-8-carboxylic acid used in this example may be obtained by the following method:

A mixture of 60 parts of anthraquinone-1:5-dicarboxylic acid, 26 parts of hydrazine sulphate, 300 parts of water, 22.5 parts of caustic soda and 15 parts of sodium chloride is heated at 80° C. for 24 hours. The sodium salt of anthra - 1′:9′(N)-pyridazone - 8 - carboxylic acid slowly crystallises out, and is filtered off, and dissolved in water. The solution so obtained is acidified by addition of hydrochloric acid to precipitate anthra-1′:9′(N)-pyridazone-8-carboxylic acid which is a yellow powder melting at 389° C.

*Example 20*

The 4 parts of 2 - (2″:6″ - dimethylphenyl)anthra-1′:9′(N)-pyridazone-8-carboxylic acid used in Example 2 are replaced by 2 parts of 2-(2″:6″-dimethylphenyl) anthra-1′:9′(N)-pyridazone-6-carboxylic acid. The 2-(2″:6″-dimethylphenyl) - 7 - n - butylanthra-1′:9′(N): 10′(N):4′-dipyridazone obtained is a pale yellow solid melting between 240° C. and 242° C.

The 2 - (2″:6″ - dimethylphenyl)anthra - 1′:9′(N)-pyridazone-6-carboxylic acid used in the above example may be obtained as follows:

A mixture of 3 parts of anthraquinone-1:4-dicarboxylic acid, 100 parts of water, 1.3 parts of caustic soda and 2 parts of 2:6-dimethylphenylhydrazine hydrochloride is boiled for 24 hours. The solution so obtained is filtered and 10 parts of sodium chloride are added to the filtrate. The soduim salt of 2 - (2″:6″ - dimethylphenyl)anthra-1′:9′(N)-pyridazone-6-carboxylic acid which is precipitated is filtered off and redissolved in water. The solution so obtained is acidified by addition of hydrochloric acid to precipitate 2-(2″:6″-dimethylphenyl)anthra-1′:9′(N)-pyridazone-6-carboxylic acid which is a yellow solid melting between 283° C. and 287° C.

*Example 21*

A mixture of 3 parts of anthraquinone-1:4-dicarboxylic acid and 5 parts of n-butylhydrazine is heated at 200° C. for 30 minutes. The product is extracted with 2% aqueous sodium carbonate solution and the residue is crystallised from o-dichlorobenzene. There is obtained 2:7-di-n-butylanthra-1′:9′(N):10′(N):4′-dipyridazone as pale yellow crystals melting at 183° C.

Example 22

The 5 parts of n-butylhydrazine used in Example 21 are replaced by 6 parts of o-chlorophenylhydrazine. There is obtained 2:7-di-o-chlorophenylanthra-1':9'(N):10'(N):4'-di-pyridazone as a pale cream powder melting between 412° C. and 414° C.

Example 23

The anthraquinone-1:5-dicarboxylic acid used in Example 10 is replaced by anthraquinone-1:4-dicarboxylic acid. There is obtained 2:7-di(2":6"-dimethylphenyl) anthra-1':9'(N):10'(N):4'-dipyridazone as a pale yellow powder which melts at 358° C.

Example 24

A mixture of 5 parts of 1:5-dicyanoanthraquinone, 5 parts of hydrazine hydrate, and 50 parts of sulphuric acid is heated at 180° C. for 10 minutes. The product is poured into water, and the suspension so obtained is filtered. The residue is boiled with dilute sodium carbonate solution, and again filtered off and dried. There is obtained anthra-1':9'(N):10'(N):5'-dipyridazone identical with that obtained in Example 9.

Example 25

0.2 parts of 2:8-di(2":6"-dimethylphenyl)anthra-1':9'(N):10'(N):5'-dipyridazone are milled with 0.02 part of sodium dinaphthylmethane-disulphonate and 20 parts of water. 0.4 part of the dispersion so obtained is added to 80 parts of water containing 0.8 part of the sodium salt of cetyl oleyl sulphate. 2 parts of polyethylene terephthalate fabric are then added and the mixture is heated at 130° C. in a pressure vessel for 1 hour. After cooling and rinsing the fabric is superior in whiteness to that obtained when not whitening agent is employed.

Example 26

0.2 part of 2-(2":6"-dimethylphenyl)anthra-1':9'(N):10'(N):5'-dipyridazone are dispersed in 20 parts of water and the dispersion so obtained is added to 4000 parts of water containing 4 parts of the sodium salt of cetyl oleyl alcohol sulphate. 100 parts of polyethylene terephthalate fabric are added and the mixture is heated at the boil for one hour. The fabric is then rinsed and dried and is superior in whiteness to that obtained when no whitening agent is employed. The effect is of good fastness to light.

Example 27

0.05 part of 2:8-di(2":6"-dimethylphenyl)anthra-1':9'(N):10'(N):5'-dipyridazone and 0.05 part of 2-(2":6"-dimethylphenyl)anthra-1':9'(N):10'(N):5'-dipyridazone are dispersed in 10 parts of water containing 0.05 part of the sodium salt of cetyl oleyl sulphate and the whole made up to 50 parts with water. Polyethylene terephthalate fabric is passed through this dispersion and then between rollers, dried and baked for 20 seconds at 220° C. The fabric is then washed in a solution of 2 parts of soap in 1000 parts of water at 60° C. for 30 minutes, rinsed with water and dried. The fabric is superior in whiteness to that obtained when no agent is employed.

Example 28

1000 parts of polyhexamethylene adipamide in the form of small chips are mixed with one part of 2:8-di(2":6"-dimethylphenyl)anthra-1':9'(N):10'(N):5'-dipyridazone. The chips are then melt spun into yarn in conventional spinning equipment. The resultant yarn is superior in whiteness to that obtained when no agent is employed.

Example 29

The 1000 parts of polyhexamethylene adipamide used in Example 28 are replaced by 1000 parts of the polyamide derived from caprolactam. A yarn is obtained which is superior in whiteness to that obtained when no whitening agent is employed.

Example 30

The 1000 parts of polyhexamethylene adipamide used in Example 28 are replaced by 1000 parts of polyethylene terephthalate. A yarn is obtained which is considerably superior in whiteness to that obtained when no whitening agent is present.

Example 31

The 1 part of 2:8-di(2":6"-dimethylphenyl)anthra-1':9'(N):10'(N):5'-dipyridazone used in Example 30 is replaced by 0.5 part of 2:8-di(2":6"-diethylphenyl)anthra-1':9'(N):10'(N):5'-dipyridazone. A yarn is obtained which is considerably superior in whiteness to that obtained when no whitening agent is present.

Example 32

1 part of 2:8-di(2"-chlorophenyl)anthra-1':9'(N):10'(N):5'-dipyridazone, 100 parts of titanium dioxide (rutile grade) and 10,000 parts of cellulose acetate plasticised with 3500 parts of dimethylphthalate are thoroughly mixed and then masticated on heated rollers. The product so obtained is compression moulded at 150° C. for 3 minutes to give mouldings which are markedly whiter than similar mouldings prepared without use of the agent and which possess very good heat stability and fastness to daylight.

Example 33

The 1 part of 2:8-di(2"-chlorophenyl)anthra - 1':9'(N):10'(N):5'-dipyridazone used in Example 32 is replaced by 1 part of 2:8-di(2":6"-dimethylphenyl)anthra-1':9'(N):10'(N):5'-dipyridazone. The mouldings obtained are markedly whiter than similar mouldings prepared without the agent, and possess very good heat stability and fastness to daylight.

Example 34

A mixture of 100 parts of dimethyl terephthalate, 63 parts of ethylene glycol and 0.05 part of calcium acetate is boiled under an atmosphere of oxygen-free nitrogen for 2.5 hours. the methanol liberated in the reaction being removed by distillation. 0.025 part of phosphorous acid, 0.02 part of antimony oxide and 0.05 part of 2:8-di(2":6"-dimethylphenyl)anthra-1':9'(N):10'(N):5' - dipyridazone are added and the mixture is heated at 285° C. for 3 hours under 0.3 mm. pressure of mercury. The polyethylene terephthalate so obtained has an intrinsic viscosity of 0.65 and is superior in whiteness to that obtained when no whitening agent is present. The effect is of very good fastness to light.

Example 35

The 0.2 part of 2-(2":6"-dimethylphenyl)anthra-1':9'(N):10'(N):5'-dipyridazone used in Example 26 are replaced by 0.2 part of 2-(2":6"-dimethylphenyl)-7-n-butyl-anthra-1':9'(N):10'(N):4-dipyridazone. The fabric obtained is superior in whiteness to that obtained when no whitening agent is employed.

What we claim is:

1. Anthra-1':9'(N):10'(N):5'-dipyridazones and anthra-1':9'(N):10'(N):4'-dipyridazones of the formulae:

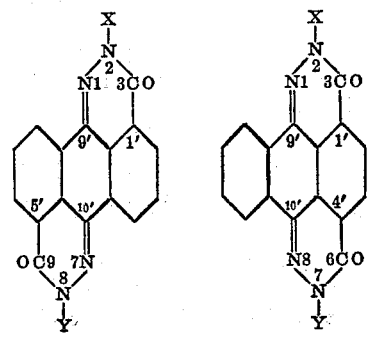

wherein X and Y are selected from the class of radicals consisting of hydrogen, methyl, ethyl, butyl, hydroxyethyl, carboxymethylene, allyl, naphthyl, pyridyl, phenyl, and substituted phenyl radicals, the phenyl substituents being selected from the class consisting of chlorine, bromine, methyl, and ethyl.

2. 2:8 - di(2″:6″-dimethylphenyl)anthra-1′:9′(N):10′(N):5′-dipyridazone.

3. 2-(2″: 6″-dimethylphenyl)anthra-1′:9′(N):10′(N):5′-dipyridazone.

4. 2:8 - di(2″: 6″- diethylphenyl)anthra-1′:9′(N):10′(N):5′-dipyridazone.

5. 2:8-di(2″- chlorophenyl)anthra-1′: 9′(N):10′(N):5′-dipyridazone.

6. 2-(2″: 6″- dimethylphenyl)-7 - n - butyl-anthra-1′:9′(N):10′(N):4-dipyridazone.

7. 2:8 - di(2″- hydroxyethyl)anthra-1′:9′(N):10′(N):5′-dipyridazone.

References Cited in the file of this patent

UNITED STATES PATENTS

| | | |
|---|---|---|
| 2,600,004 | Krohler | June 10, 1952 |
| 2,715,632 | Sartori | Aug. 16, 1955 |
| 2,782,195 | Riehen | Feb. 19, 1957 |
| 2,783,232 | Birsfelden | Feb. 26, 1957 |
| 2,837,485 | Siegrist | June 3, 1958 |

FOREIGN PATENTS

| | | |
|---|---|---|
| 2,948 | Great Britain | Sept. 26, 1912 |
| 260,577 | Switzerland | July 16, 1949 |